UNITED STATES PATENT OFFICE.

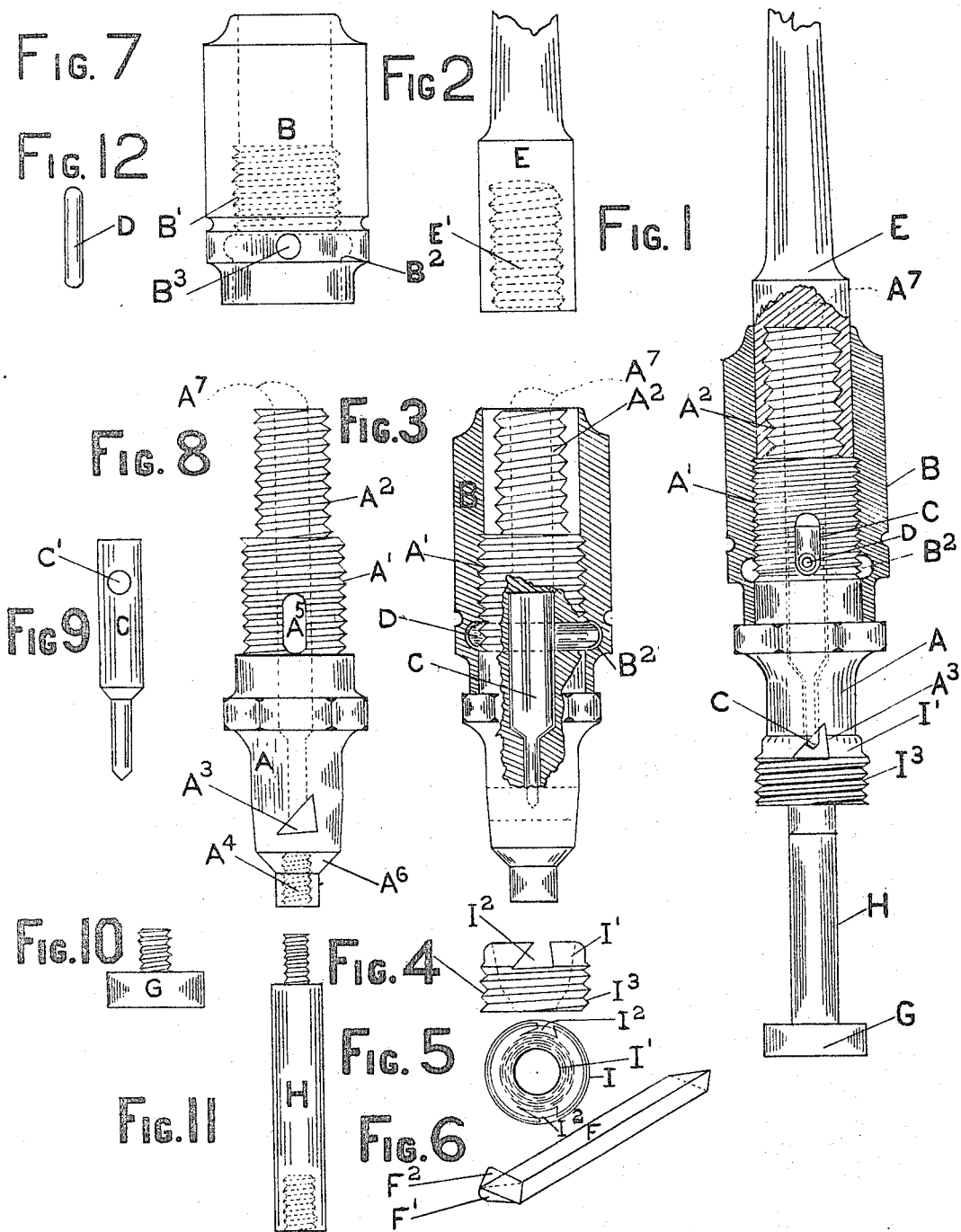

AARON T. ROSSIGNOL, OF SAVANNAH, GEORGIA, ASSIGNOR OF ONE-HALF TO BRYANT BEASLEY, OF SAVANNAH, GEORGIA.

COUNTERBORING-TOOL.

1,232,980.  Specification of Letters Patent.  Patented July 10, 1917.

Application filed November 12, 1915. Serial No. 61,073.

*To all whom it may concern:*

Be it known that I, AARON T. ROSSIGNOL, a citizen of the United States, and a resident of the city of Savannah, in the county of Chatham and State of Georgia, have invented a certain new and useful Improvement in Counterboring-Tools and an Improved Means of Holding the Cutting Instrument in Such Tools.

My invention relates particularly to that type of tools which is used for counterboring woodwork.

Figure 1 is an elevation of tool assembled ready for insertion of cutting tool, parts being cut away and part shown in vertical cross section. Fig. 2 is an elevation of tool shank, with upper part broken away. Fig. 3 is the same as Fig. 1, except that shank is removed and cross section shown at right angles to cross section shown in Fig. 1. Fig. 4 is a side elevation of feed die. Fig. 5 is a top view of feed die. Fig. 6 is a perspective of cutting tool or knife. Fig. 7 is an elevation of a sleeve. Fig. 8 is an elevation of tool stock. Fig. 9 is an elevation of set pin. Fig. 10 is an elevation of guide block. Fig. 11 is an elevation of extension guide rod. Fig. 12 is elevation of lock pin.

Referring to the drawings by letters and numerals, like numbers indicating like parts in the several views. A is the tool stock, which is bored longitudinally as shown by the broken lines, $A^7$. A is provided with a longitudinal and radial slot, $A^5$ and is screw threaded at $A'$ and $A^2$, the threaded portion, $A'$ being larger than the threaded portion, $A^2$. A is also provided with a prismoidal transverse-pole, $A^3$ is tapered at its lower end $A^6$, and bored and threaded at its lower end $A^4$.

B is a sleeve the upper portion of which is smooth bored and the lower portion provided with an internal screw thread, $B'$ except the extreme lower portion which is smooth bored and chambered to fit shoulder on tool stock. B is also provided with an annular internal groove $B^2$, and has a bore through one side, $B^3$. $B^3$ is coincident with the groove $B^2$. C is a cylindrical set pin reduced in size at and near its lower end, as clearly shown in drawing, to conform to the lower part of the bore $A^7$. C is provided with a bore or hole $C'$. D is a cylindrical lock pin with rounded ends to conform to the groove $B^2$. E is the shank of the tool with upper part cut away. E is provided with a threaded bore $E'$. F is a cutting tool or knife, which is provided with a cutting lip, $F'$ and a shaving guide $F^2$. G is a cylindrical guide block provided with a threaded bolt integral therewith. H is an extension guide rod, reduced and threaded at one end and bored and threaded at the other. I is a feed die, which has a tapered bore $I'$ and a truncated prismoidal slot, $I^2$.

To assemble this tool the sleeve, B, is screwed loosely over tool stock A and so positioned that the hole $B^3$ registers with the slot $A^5$; the set pin, C, is placed in the bore, $A^7$, and so positioned that the hole, $C'$, registers with the hole $B^3$ and the slot $A^5$. The lock pin, D, is then placed in position through the hole, $B^3$. The hole, $B^3$, is then plugged with a screw or pin to keep the lock pin in position. I deem it unnecessary to show this screw or pin on drawing. The feed die, I, is then placed in position so that the truncated prismoidal slots $I^2$, will register with the prismoidal hole, $A^3$, and the cutting tool, F, is then positioned through the prism slot $A^3$ and the slots $I^2$. The lower end of the set pin, C, will then be positioned upon the cutting tool F, and by screwing the sleeve, B, down tightly, pressure will be applied to the lock pin, D, the set pin, C, and the cutting tool F, and the cutting tool and feed die will be locked firmly in position. The further assembling of the tool is obvious from the drawings.

In practice an extension rod H is used with my invention, unless the hole to be counterbored is so shallow as to preclude its use. In such cases the guide block, G, is screwed directly to the tool stock A. The feed die, I, may be of any desired size and is interchangeable.

I am aware that it is not new to provide a prism shaped knife and slot and I do not claim this as part of my invention. I do not, however, confine myself to the use of a prism shaped knife or cutter, but may use a cutting tool of other design or shape.

I claim:

In a counterboring tool and in combination a tool stock having a transverse hole, a feed die having a longitudinal bore and transverse slots, a cutting tool and a cylindrical guide block, the guide block being removably mounted below said feed die and central thereof, for the purpose and substantially as described.

AARON T. ROSSIGNOL.

Witnesses:
H. C. RUME,
JNO. J. BOUHAN.